July 31, 1951     M. S. CUSHMAN     2,562,842

BOTTLE CAP LIFTER

Filed Jan. 19, 1950

INVENTOR.
Myrtle S. Cushman
BY Wood, Arey, Henson & Evans
ATTORNEYS

Patented July 31, 1951

2,562,842

UNITED STATES PATENT OFFICE 2,562,842

BOTTLE CAP LIFTER

Myrtle S. Cushman, Cincinnati, Ohio, assignor of one-half to Ralph A. Cushman, Cincinnati, Ohio Application January 19, 1950, Serial No. 139,334

1 Claim. (Cl. 81—3.46)

This invention relates to a combination tool for use in and around the home and is particularly concerned with a device which is adapted to perform the dual functions of cutting cheese and removing bottle caps. In the preferred construction, the bottle opener combination in and of itself represents a novel construction which has certain advantages over conventional bottle openers. A further characteristic and advantage of the preferred construction is that a portion of the bottle opener combination is utilized in cheese cutting and vice versa.

Briefly stated, the invention contemplates a simple unitary tool which in its cheese cutting operation comprises the relatively conventional combination of a handle, a yoke extending from the handle, a cheese cutter wire, and a roller disposed relative to the wire for gauging and controlling the depth of the cheese cut. In its bottle opener aspect, the invention comprises a bottle cap lifter formed integrally with the fork or handle and a cylindrical fulcrum constituted by the same roller which likewise functions in the operation of cheese cutting.

The objects and advantages of the invention will be apparent from the further and more detailed description of a preferred form when considered in conjunction with the drawings in which.

Figure 1:
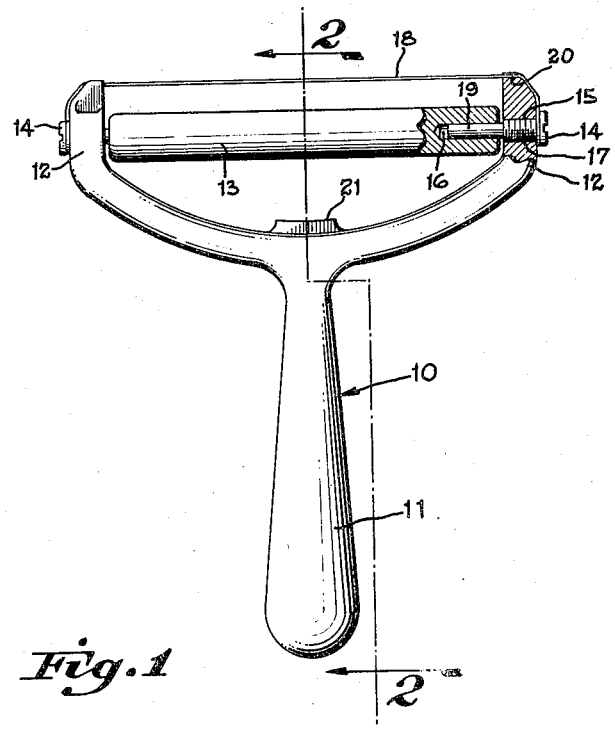
Figure 1 is a front elevation of the entire device, partially broken away at one corner to show the details of the roller mounting and the attachment of the cheese cutting wire.

Referring further to the drawings and particularly Figure 1 for a detailed description of the invention, 10 indicates the entire device, the frame of which comprises a handle member 11 and a pair of identically configurated forked arms 12—12 constituting a yoke. Mounted between the arms and supported thereby is a cylindrical member 13 which is preferably mounted for rotation.

In the preferred embodiment as illustrated, pins 14 are inserted through bores 15 in the arms 12 with their extended ends positioned in the blind holes 16 formed axially in the ends of the cylindrical member 13 which is otherwise solid. The portion of the pin 14, which is designated 17, is preferably screwthreaded for engagement with corresponding screw threads in the sides of the bore 15 to permit tightening of the cheese cutting wire 18 in the manner hereinafter described. Another portion of the pin 14, which is designated 19, is smooth sided to allow for the rotation of the cylindrical member 13 in the holes 16.

The cheese cutting wire designated 18 has its ends supported in a slot 20 in the outer surface of the arms 12—12, this slot extending from the upper edge surface of the arms 12 to the bore 15. The extreme ends of the wire 18 are then tightly wound around or otherwise secured to the pins 14 so that the turning of the pins 14 or one of them in its bore 15 serves to tighten the wire if this should become necessary.

The bottle lifter element which is utilized to pry up the edge of a bottle cap is designated 21 and preferably is formed integrally with the handle and forked member. All of the various elements are preferably formed from metal to give the requisite strength, and either iron, aluminum or stainless steel may be utilized advantageously.

The cheese cutting operation has not been fully illustrated because it is believed that it will be apparent from an examination of the structure. The actual cutting is, of course, performed by the wire cutter 18 while the cylindrical member 13 serves as a support or guide. The depth of the cut can be varied as desired by a simple inclination of the handle during the cutting operation.

Figure 2:
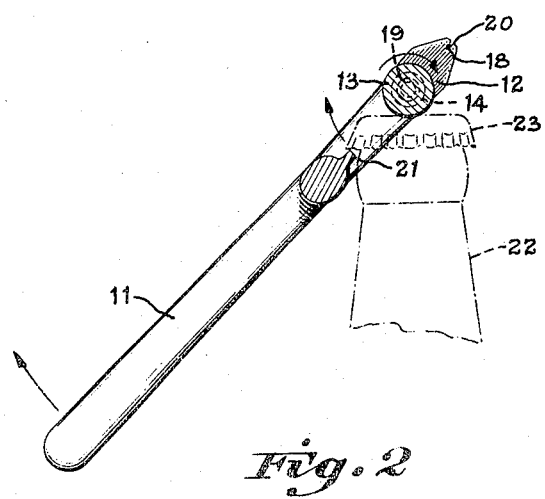
Figure 2 is a sectional view, along the line 2—2 of Figure 1, illustrating the operation of the device in performing its function as a bottle opener.

The bottle opening operation is clearly illustrated in Figure 2, in which 22 represents the neck of a bottle of conventional configuration, and 23, a conventional crown cap. As illustrated, the device is placed at an angle with the lifter 21 inserted beneath the lower edge of the cap and the cylindrical member 13 resting on the upper surface of the cap. As the handle is lifted in the direction of the arrows, the cylindrical member is rotated on its axis in the manner indicated rolling smoothly and easily across the top of the cap and this rotation facilitates the cap removal in comparison with the operation of a device in which the fulcrum member is flat sided and rigid.

In addition to the combination structural utility which has been pointed out, the device also has a combination functional utility in that cheese and crackers are frequently eaten at the same time beer and soft drinks are consumed. On such an occasion, the device of the invention effectively performs both of the required functions.

Having fully described my invention, I claim:

A bottle opener comprising a handle, a yoke including a pair of spaced arms extending from the handle, a cylindrical abutment spanning the arms of the yoke and rotatably secured thereto, and a lifter formed integral with and on the inner surface of the yoke, said lifter being spaced substantially equi-distant from the arms of the yoke and terminating in an edge portion of reduced thickness capable of being inserted beneath the edge of a crown cap, said cylindrical abutment being spaced from said edge portion of the lifter a distance which is greater than the height of the crown cap but less than its diameter, whereby said abutment may be caused to rest on the upper surface of the cap when the edge portion of the lifter is engaged with the edge of said cap and whereby the cylindrical abutment may engage the upper surface of the cap in rolling traction as the handle is elevated.

MYRTLE S. CUSHMAN.

REFERENCES CITED

The following references are of record in the file of this patent:

UNITED STATES PATENTS

| Number | Name | Date |
| --- | --- | --- |
| 501,050 | Bernardin | July 11, 1893 |
| 1,939,283 | Shailer | Dec. 12, 1933 |